(12) United States Patent
Lin

(10) Patent No.: US 7,987,553 B2
(45) Date of Patent: Aug. 2, 2011

(54) CASTER WITH A BRAKE STRUCTURE

(75) Inventor: Ching-Sung Lin, Douliou (TW)

(73) Assignee: Catis Pacific Mfg. Corp. Ltd., Yunlin County (TW)

( * ) Notice: Subject to any disclaimer, the term of this patent is extended or adjusted under 35 U.S.C. 154(b) by 212 days.

(21) Appl. No.: 12/426,363

(22) Filed: Apr. 20, 2009

(65) Prior Publication Data

US 2010/0263164 A1   Oct. 21, 2010

(51) Int. Cl.
*B60B 33/00* (2006.01)
(52) U.S. Cl. ...................................... 16/35 R
(58) Field of Classification Search ............ 16/35 R, 16/18 R; 188/1.12
See application file for complete search history.

(56) References Cited

U.S. PATENT DOCUMENTS

| | | | | |
|---|---|---|---|---|
| 4,649,596 A * | 3/1987 | Kassai | ............................ | 16/35 R |
| 5,988,323 A * | 11/1999 | Chu | ............................ | 188/1.12 |
| 6,619,438 B1 * | 9/2003 | Yang | ............................ | 188/1.12 |
| 7,520,021 B2 * | 4/2009 | Chou | ............................ | 16/35 R |
| 7,861,370 B2 * | 1/2011 | Chu | ............................ | 16/35 R |
| 2007/0119661 A1 * | 5/2007 | Chang | ............................ | 188/1.12 |
| 2009/0083938 A1 * | 4/2009 | Lin | ............................ | 16/47 |
| 2009/0119878 A1 * | 5/2009 | Chou | ............................ | 16/35 R |

* cited by examiner

*Primary Examiner* — Victor Batson
*Assistant Examiner* — Matthew Sullivan

(57) ABSTRACT

A caster with a brake structure comprises a pivot plate. The pivot plate is allowed to pivot so as to be inserted into a corresponding positioning recess in an inner side of a wheel to stop the rotation of the wheel. Furthermore, while pivoting, the pivot plate will press the lifting block to move downwards, and then the lifting block will push the slide block to move horizontally, and finally the slide block will push the anti-slip block to press against the inner side of the wheel, thus improving the braking effect.

7 Claims, 9 Drawing Sheets

CASTER WITH A BRAKE STRUCTURE

BACKGROUND OF THE INVENTION

1. Field of the Invention

The present invention relates to a caster; and more particularly to a caster with a brake structure.

2. Description of the Prior Art

Casters are normally installed on various machines, cabinets, platforms or even nursing beds, and etc in order to make them to move smoothly and conveniently. When those apparatuses installed with the casters reach a desired position, the casters should be braked and stopped from rotation. Hence, many braking technologies for caster were developed on the market and generally include two types: one is the technology that employs an anti-slip block to press against the wheel on the caster to stop the caster by friction, such as: Taiwan Patent No. 096219293, entitled "brake structure for a caster", and the other is the technology that engages a positioning element into the wheel to brake and stop the rotation the caster, such as Taiwan Patent No. 096218417, entitled "brake device for a caster" discloses engaging a positioning block into a groove in an inner side of the wheel to stop the caster, and Taiwan Patent No. 093210074, entitled "caster brake structure", discloses inserting a pin into a through hole in the caster to stop the caster.

Although the above two common braking technologies for caster can stop the rotation of the caster, but they suffer from their respective problems. As for the technology that employs an anti-slip block to press the wheel to stop the caster, the braking force depends on the friction, so if an external force is greater than the static friction applied to the wheel by the anti-slip block, the wheel can rotate, thus losing the braking function. Especially, after a long time of use and abrasion, the static friction between the anti-slip block and the wheel will eventually become much smaller. Therefore, it is more difficult to stop the caster at the desired position.

In addition, as for the technology that engages a positioning element into the wheel to stop the caster, in order to make it easier and smoother for the positioning element to engage into the caster, a portion of the caster to be engaged with the positioning element is sized a little greater than the positioning element, so that even if the positioning element is engaged into the caster, the caster can still swivel slightly, thus providing a poor braking effect.

The present invention has arisen to mitigate and/or obviate the afore-described disadvantages.

SUMMARY OF THE INVENTION

The primary objective of the present invention is to provide a caster with a brake structure, which utilizes a rotation of a pivot plate to move an anti-slip block to press against an inner side of the wheel and insert the pivot plate into a positioning recess in the inner side of the wheel so as to stop the rotation of the wheel.

In order to achieve the above objective, a caster with a brake structure in accordance with the present invention comprises a fame body, an operating element, a pivot plate, a lifting block, a slide block, an anti-slip block and a wheel. The operating element is inserted through the frame body, and the pivot plate is pivoted to the frame body. A first end of the pivot plate supports against the operating element, and a second end of the pivot plate includes at least one engaging edge. The lifting block is elastically disposed on the frame body and located at a lower side of the pivot plate. The first end of the pivot plate presses against an upper side of the lifting block. The slide block is slidably disposed on the frame body. Between the lifting block and the slide block is disposed a push means for pushing the slide block to move horizontally while the lifting block descends. The anti-slip block is elastically disposed on the frame body and located in a moving direction of the slide block. The wheel is rotatably disposed on the frame body and provided in an inner side thereof with at least one positioning recess opposite the engaging edge of the pivot plate, and a press surface opposite the anti-slip block.

When the caster needs stopping, the operating element will push the pivot plate to pivot to insert the engaging edge of the pivot plate into the positioning recess of the wheel to stop the rotation of the wheel, at the same time, the pivot plate will push the lifting block to move downwards, and then the lifting block will push the slide block to move horizontally through the push means. Subsequently, the slide block will push the anti-slip block to move and press against the press surface of the wheel to stop the rotation of the wheel. By such arrangements, the present invention makes use of a dual braking technology to improve the braking effect.

The push means between the lifting block and the slide block can include a inclined push surface on a lower side of the lifting block and an inclined surface on an upper side of the slide block. The inclined push surface of the lifting block cooperates with the inclined surface of the slide block in such a manner that when the lifting block descends, the inclined push surface of the lifting block will push against the inclined surface of the slide block to make the slide block move, and make the inclined push surface and the inclined surface slide relative to each other.

In addition, the push means can only include an inclined push surface on the lifting block to allow the lifting block to use the inclined push surface to directly push against the slide block or only include an inclined surface on the slide block to allow the lifting block to directly push against the inclined surface of the slide block. The above two arrangements both can allow the lifting block to push the lifting block to make the slide block move horizontally.

The caster can be additionally provided with a wheel, and the two wheels are coaxially disposed on the frame body to make it more convenient and stable to use the caster. The pivot plate can be inserted into the positioning recesses of both the two wheels synchronously, and at the same time, the anti-slip block can press against the press surfaces of the two wheels synchronously, thus stopping the rotation of the two wheels synchronously.

DETAILED DESCRIPTION OF THE PREFERRED EMBODIMENTS

Figure 1:
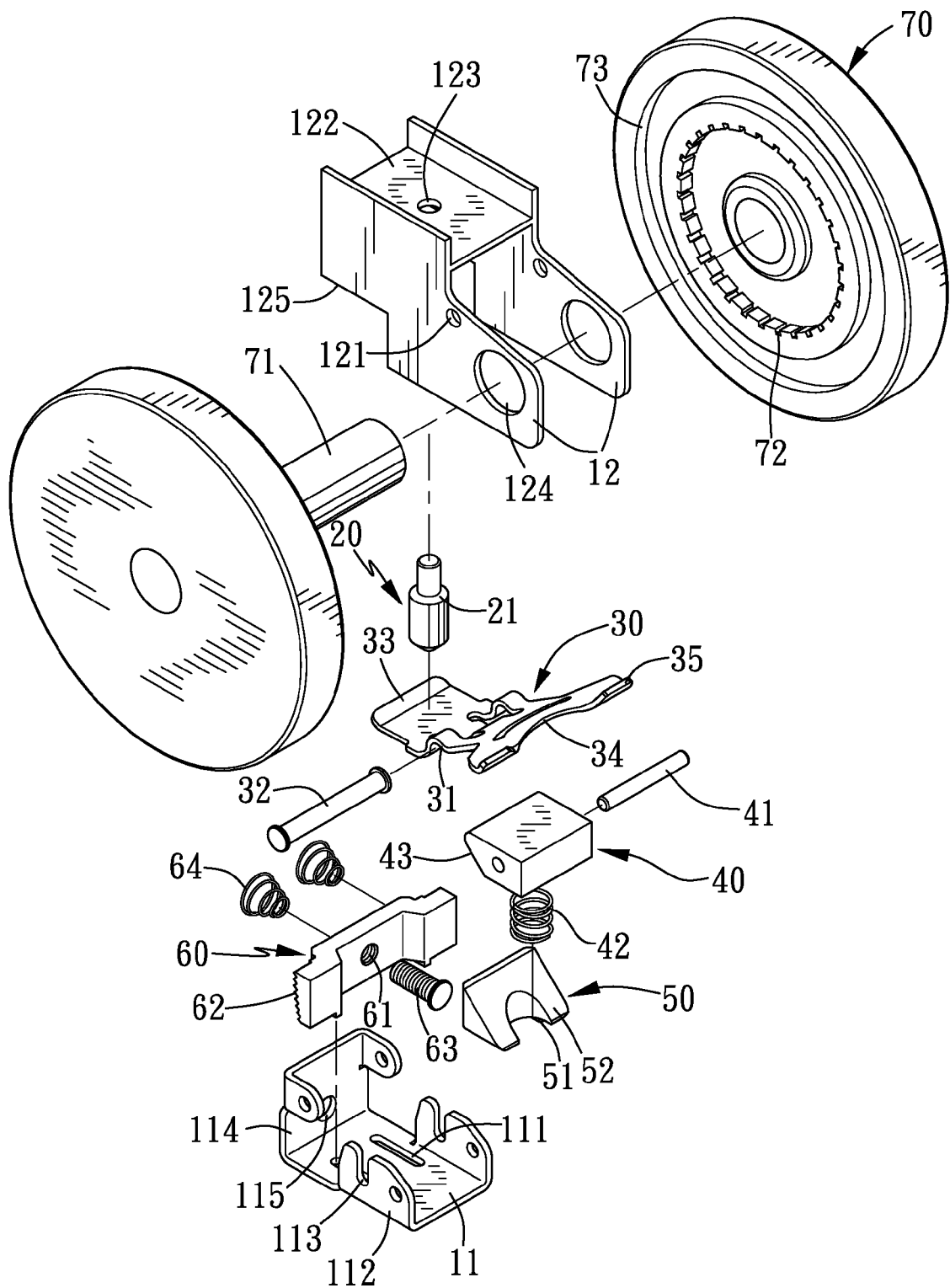
FIG. 1 is an exploded view of a caster with a brake structure in accordance with the present invention.
Figure 2:
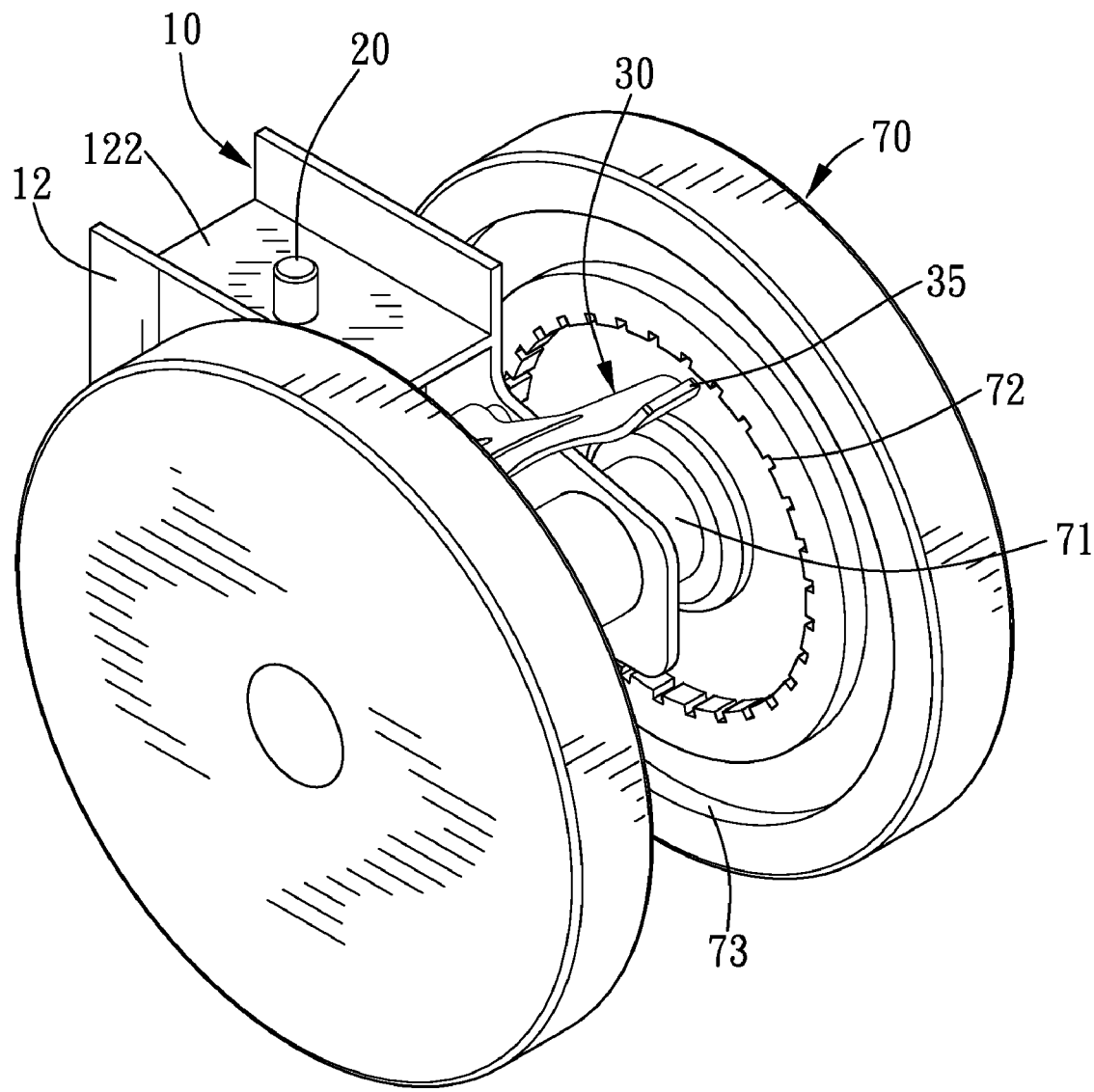
FIG. 2 is a perspective view of the caster with a brake structure in accordance with the present invention.
Figure 3:
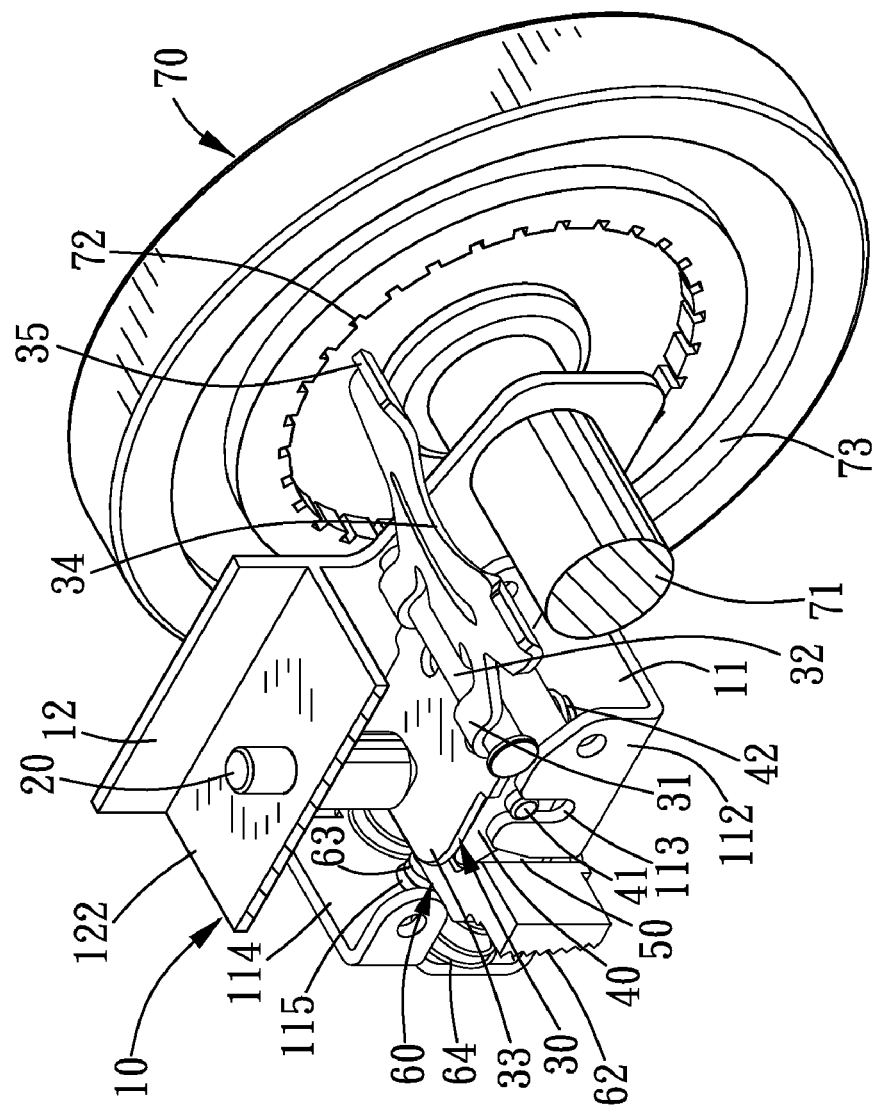
FIG. 3 is a partial perspective view of the caster with a brake structure in accordance with the present invention.
Figure 4:
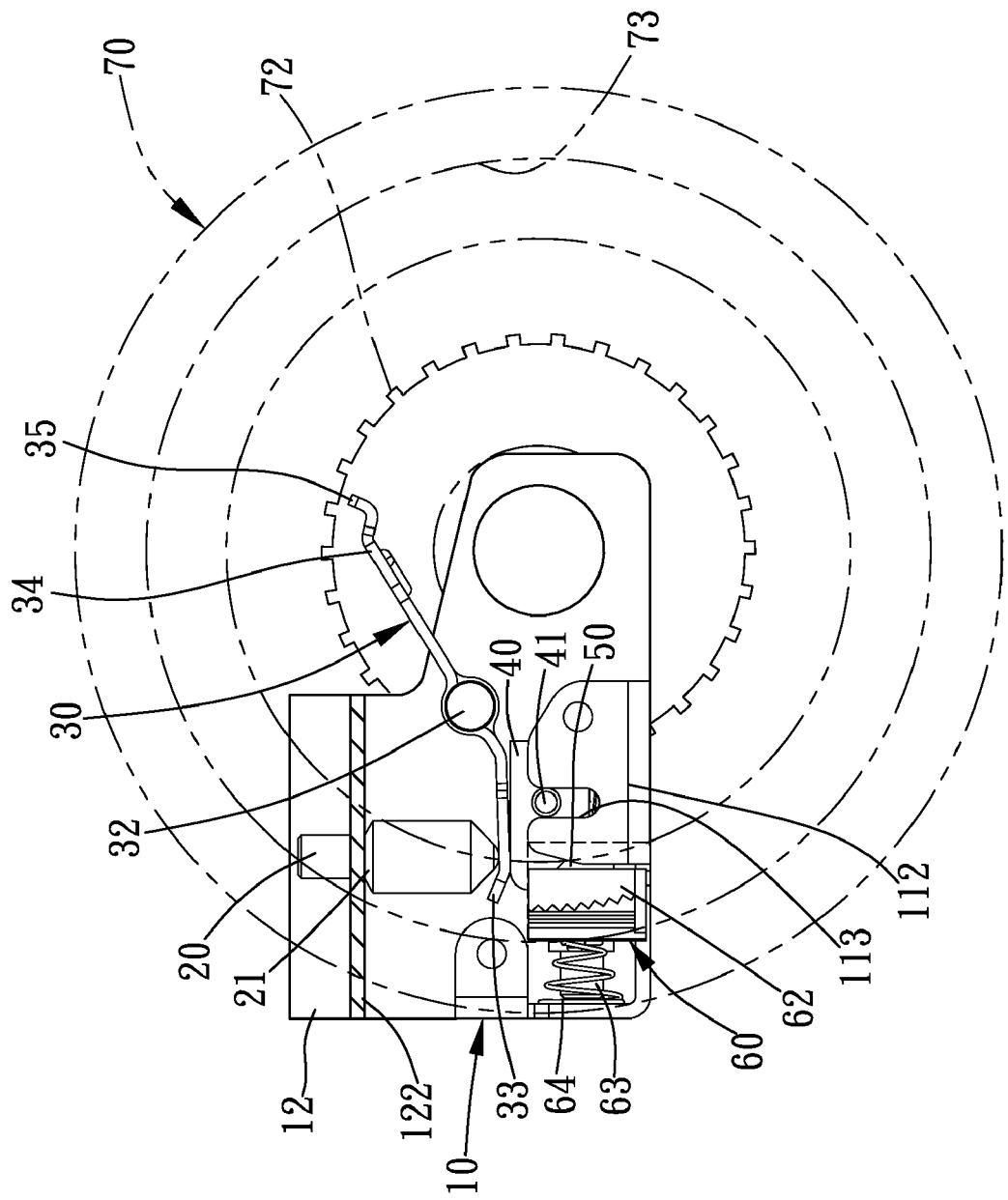
FIG. 4 is a partial cross-sectional view of the caster with a brake structure in accordance with the present invention.
Figure 5:
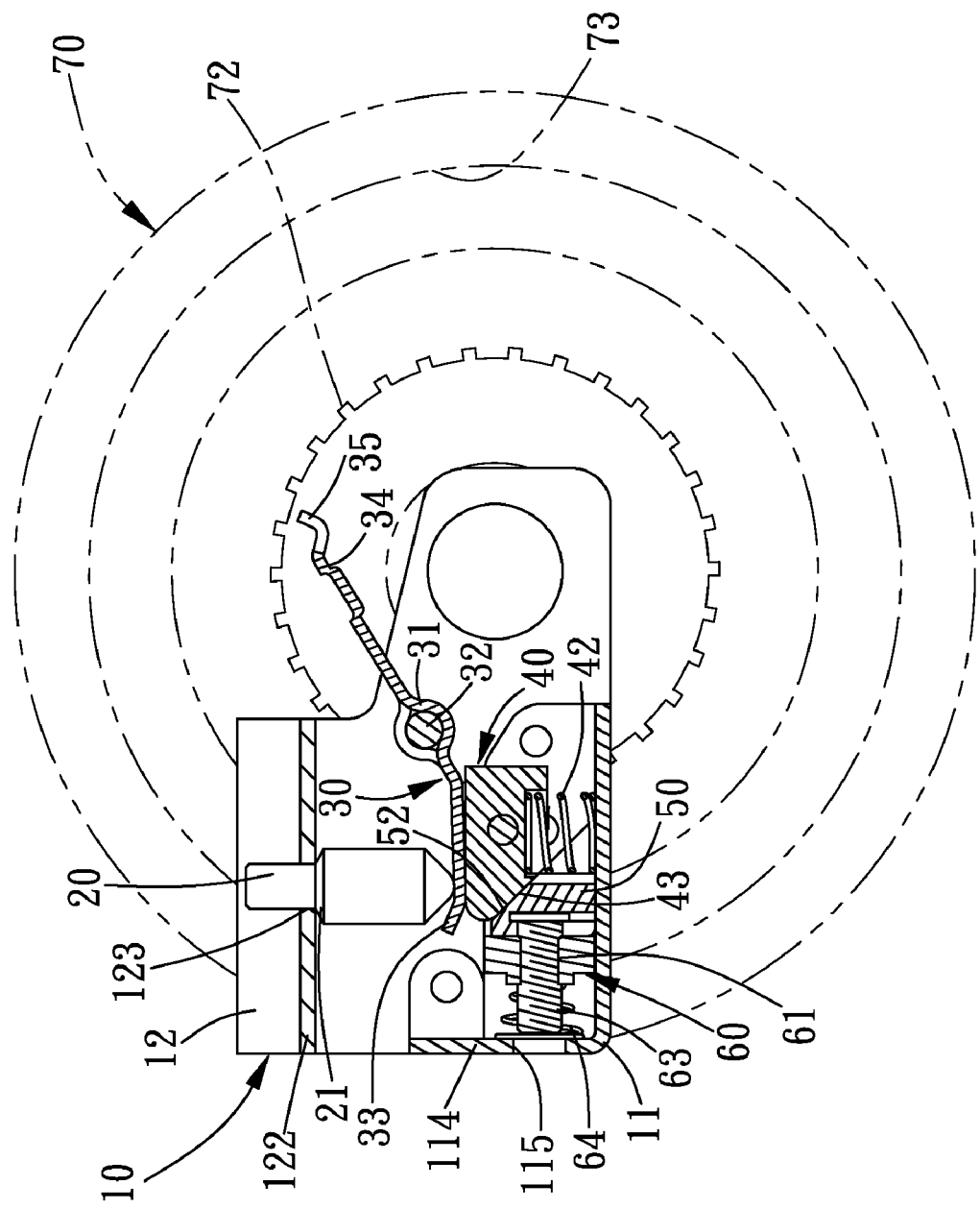
FIG. 5 is a vertical cross-sectional view of the caster with a brake structure in accordance with the present invention.

The present invention will be clearer from the following description when viewed together with the accompanying drawings, which show, for purpose of illustrations only, the preferred embodiment in accordance with the present invention.

Referring to FIGS. 1-5, a caster with a brake structure in accordance with the present invention comprises: a frame body 10, an operating element 20, a pivot plate 30, a lifting block 40, a slide block 50, and anti-slip block 60 and two wheels 70.

The frame body 10 includes a bottom frame 11 and two side frames 12. The bottom frame 11 includes two rails 111 and two vertically-extended connecting plates 112 at two opposite sides thereof. Each of the connecting plates 112 includes a vertical notch 113. The bottom frame 11 further includes a vertically-extended stop plate 114 at another side thereof. The stop plate 114 includes a through hole 115. The side frames 12 are disposed on the respective connecting plates 112 of the bottom frame 11. Each of the side frames 12 includes a pivot hole 121, a shaft-holding hole 124 and an opening 125. Between the two side frames 12 is connected a top plate 122. The top plate 122 is located above the bottom frame 11 and includes a through hole 123.

The operating element 20 is cylindrical and includes a middle shoulder portion 21 in such a manner that when one end of the operating element 20 is inserted through the through hole 123 of the top plate 122 of the frame body 10, the shoulder portion 21 can support against the top plate 122.

The pivot plate 30 includes a middle pivot portion 31. A pivot pin 32 is inserted through the pivot portion 31 of the pivot plate 30 and the pivot holes 121 of the side frames 12 of the frame body 10 to allow the pivot plate 30 to pivot relative to the frame body 10. A first end 33 of the pivot plate 30 is located under and supports against the operating element 20, and a second end 34 of the pivot plate 30 includes two engaging edges 35.

The lifting block 40 is provided with a guide pin 41. Both ends of the guide pin 41 protrude from two opposite sides of the lifting block 40 and are located in the notches 113 of the two connecting plates 112. Between the lifting block 40 and the bottom frame 11 is disposed a spring 42 in such a manner that the lifting block 40 can be elastically disposed on the frame body 10. The first end 33 of the pivot plate 30 presses against the lifting block 40.

The slide block 50 includes two protrusions 51 on a bottom thereof. The two protrusions 51 of the slide block 50 are located in the two rails 111 of the bottom frame 11 of the frame body 10, respectively in such a manner that the slide block 50 is slidably disposed on the frame body 10. Between the slide block 50 and the lifting block 40 is disposed a push means for pushing the slide block 50 to move horizontally while the lifting block 40 descends. In the present embodiment, the push means includes an inclined push surface 43 on a lower side of the lifting block 40 and an inclined surface 52 on an upper side of the slide block 50. The inclined push surface 43 of the lifting block 40 cooperates with the inclined surface 52 of the slide block 50. The slide block 50 and the lifting block 40 are vertically disposed in such a manner that the inclined push surface 43 and the inclined surface 52 are abutted against each other and inclined at 45 degrees. The inclined push surface 43 and the inclined surface 52 are disposed in the direction in which the rails 111 of the bottom frame 11 extend, so that when lifting block 40 descends, the inclined push surface 43 will push against the inclined surface 52 of the slide block 50 to make the slide block 50 slide along the rails 111 of the bottom frame 11, and make the inclined push surface 43 and the inclined surface 52 slide relative to each other. Alternatively, the push means can only include an inclined push surface 43 on the lifting block 40 for directly pushing the slide block 50, or only include an inclined surface 52 on the slide block 50 to be pushed by the lifting block 40.

The anti-slip block 60 includes a threaded hole 61 and two anti-slip portions 62. A screw 63 is screwed in the threaded hole 61 of the anti-slip block 60 and inserted through the though hole 115 of the stop plate 114 of the bottom frame 11 of the frame body 10. Between the anti-slip block 60 and the stop plate 114 of the bottom frame 11 are disposed two springs 64 in such a manner that the anti-slip block 60 can be elastically disposed on the frame body 10. The anti-slip block 60 is located in a moving direction of the anti-slip block 60, and the screw 63 of the anti-slip block 60 is abutted against the slide block 50. The two anti-slip portions 62 of the anti-slip block 60 protrude outwards from the openings 125 of the two side frames 12 of the frame body 10, respectively.

The two wheels 70 are connected through a shaft 71, and the shaft 71 is inserted in the shaft-holding holes 124 of the two side frames 12 of the frame body 10 in such a manner that the two wheels 70 can be coaxially disposed on the frame body 10, improving convenience and stability in use. Each of the wheels 70 is provided in an inner side thereof with plural annularly-arranged positioning recesses 72 opposite the engaging edge 35 of the pivot plate 30 and an annular press surface 73 opposite the anti-slip portions 62 of the anti-slip block 60.

Figure 6:
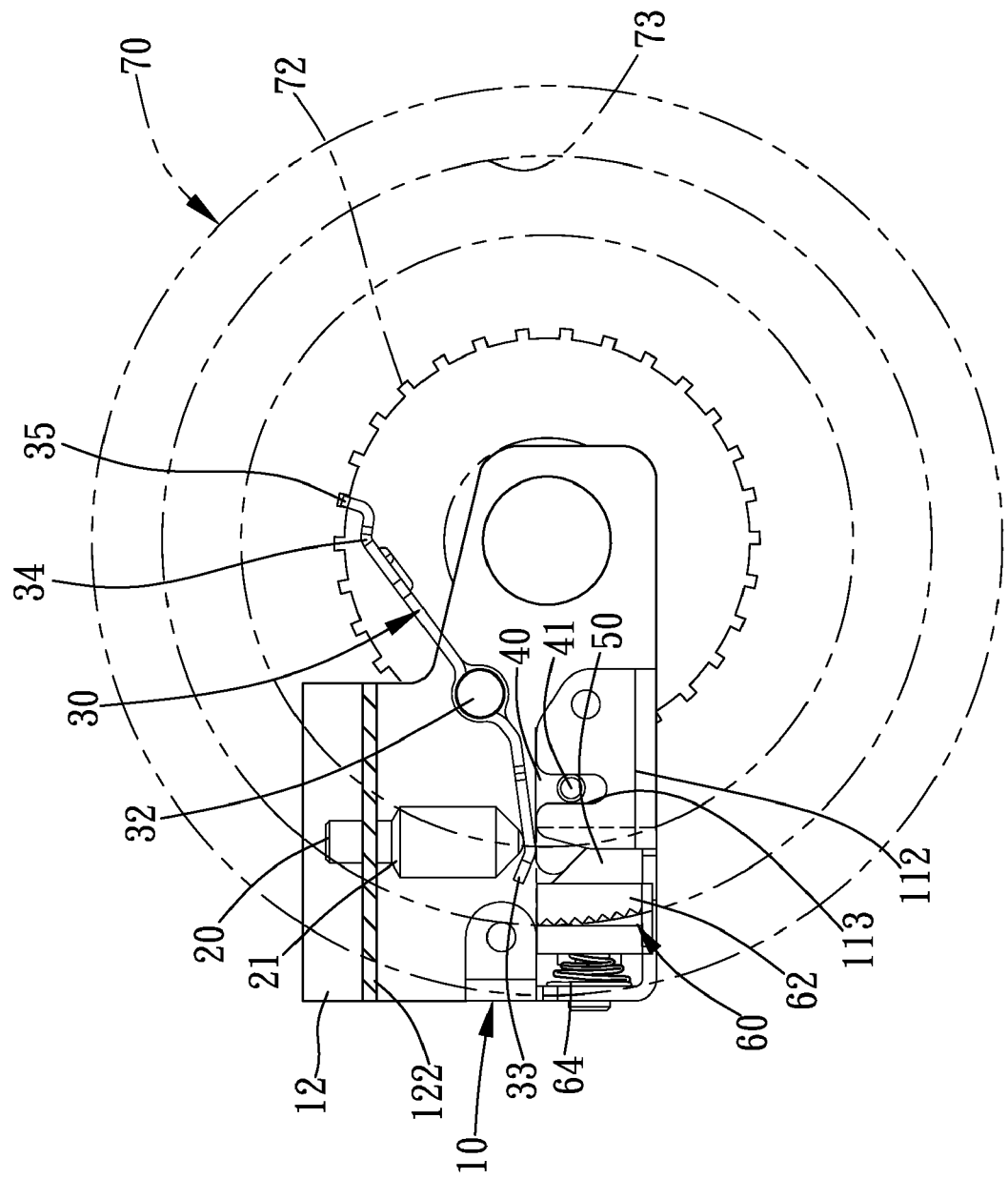
FIG. 6 is a side cross-sectional view showing how the wheel is stopped in accordance with the present invention.
Figure 7:
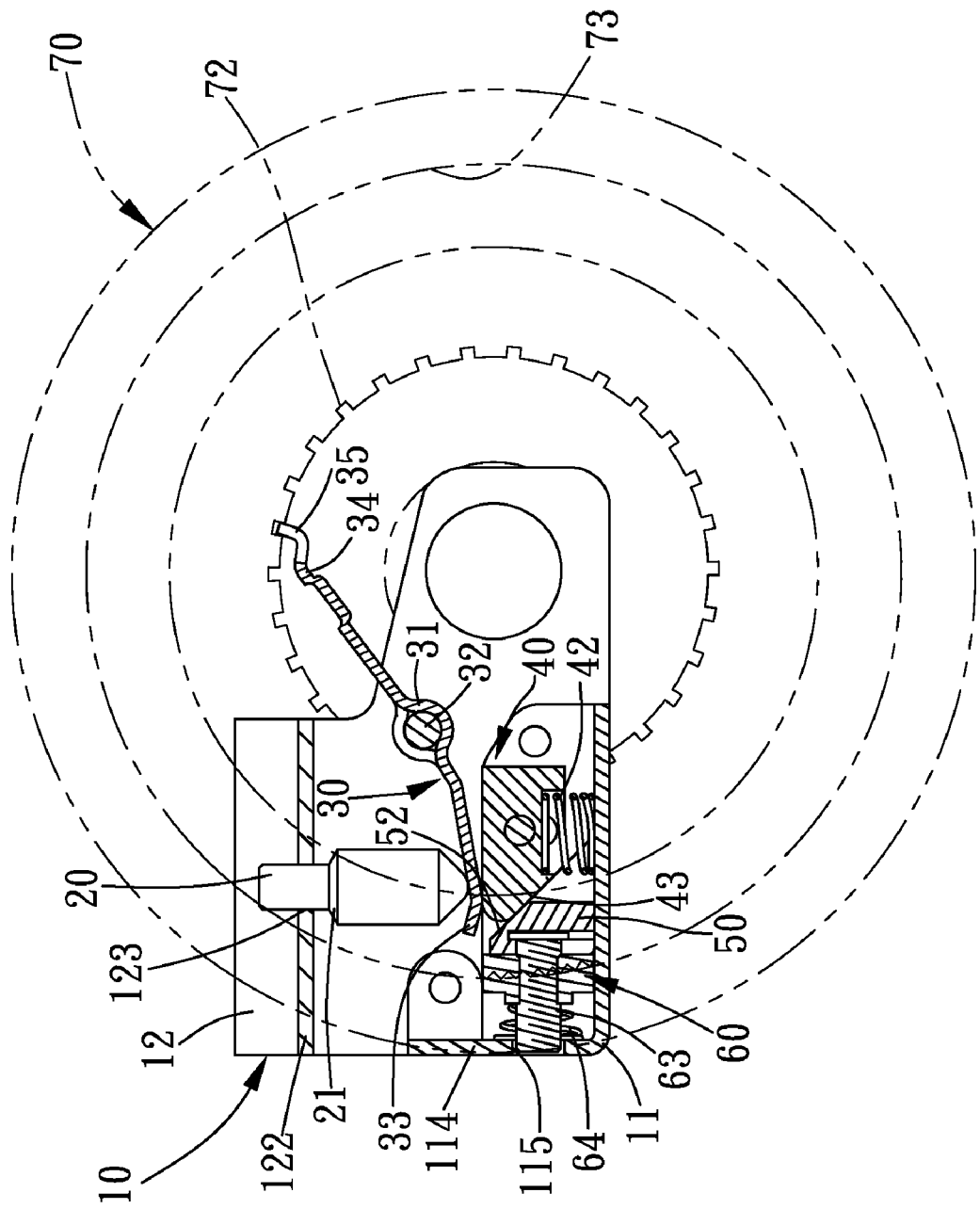
FIG. 7 is a vertical cross-sectional view showing how the wheel is stopped from rotation in accordance with the present invention.

When the casters need stopping, as shown in FIGS. 6 and 7, the operating element 20 will be pressed downwards to move the first end 33 of the pivot plate 30 downwards to make the pivot plate 30 pivot about the pivot pin 32. Subsequently, the second end 34 of the pivot plate 30 will move upwards to insert the engaging edges 35 into the corresponding positioning recesses 72 of the wheels 70 to stop the rotation of the wheels 70.

While the pivot plate 30 pivots, the first end 33 of the pivot plate 30 which moves downwards will also push against the lifting block 40 to descend along the notches 113 of the connecting plates 112 of the bottom frame 11 of the frame body 10 through the guide pin 41, at the same time, the lifting block 40 will compress the spring 42. While descending, the lifting block 40 will utilize the push means to push the slide block 50 to move horizontally. In the present embodiment, the lifting block 40 utilizes the inclined push surface 43 to push against the inclined surface 52 of the slide block 50 to make the slide block 50 move horizontally, and the inclined push surface 43 and the inclined surface 52 are allowed to slide relative to each other.

Upon moving, the slide block 50 will push the screw 63 of the anti-slip block 60 to drive the anti-slip block 60 to move and compress the two springs 64 synchronously. While the anti-slip block 60 moves, the respective anti-slip portions 62 will move toward the press surfaces 73 of the respective wheels 70, so that the respective anti-slip portions 62 of the anti-slip block 60 can press against the press surfaces 73 of the respective wheels 70 to stop the respective wheels 70. With such arrangements, the wheels 70 can be stopped by both the engaging edge 35 of the pivot plate 30 and the anti-slip portions 62 of the anti-slip block 60, thus improving the braking effect.

When the operating element 20 is released, the spring 42 of the lifting block 40 and the springs 64 of the anti-slip block 60 will push the lifting block 40 and the anti-slip block 60 to return to their original positions. Therefore, the lifting block 40 will push the pivot plate 30 to pivot in a reversed direction to make the pivot plate 30 move the operating element 20 to return to its original position, and the anti-slip block 60 will push the slide block 50 to return to its original position at the same time.

Figure 8:
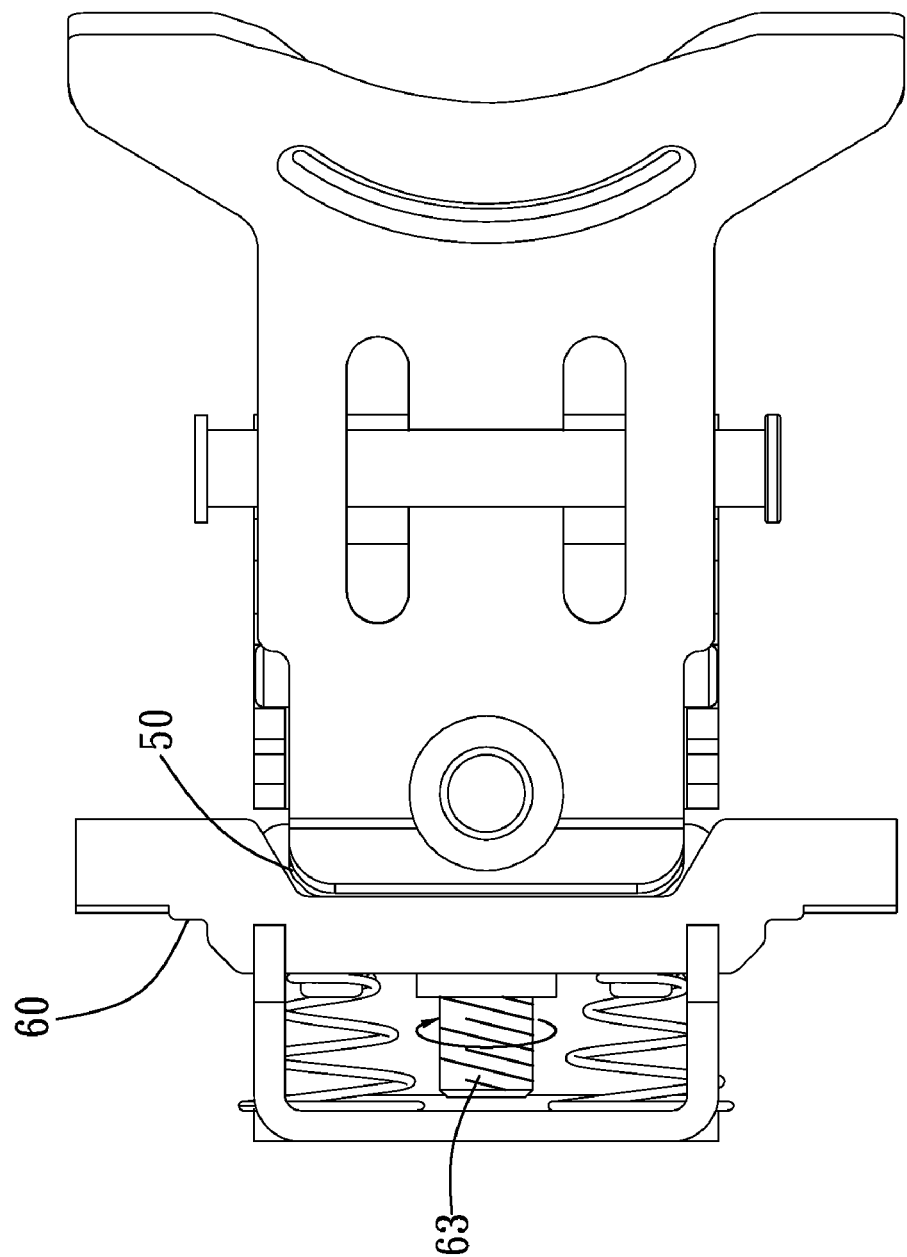
FIG. 8 is a schematic view showing how to adjust the screw in accordance with the present invention.
Figure 9:
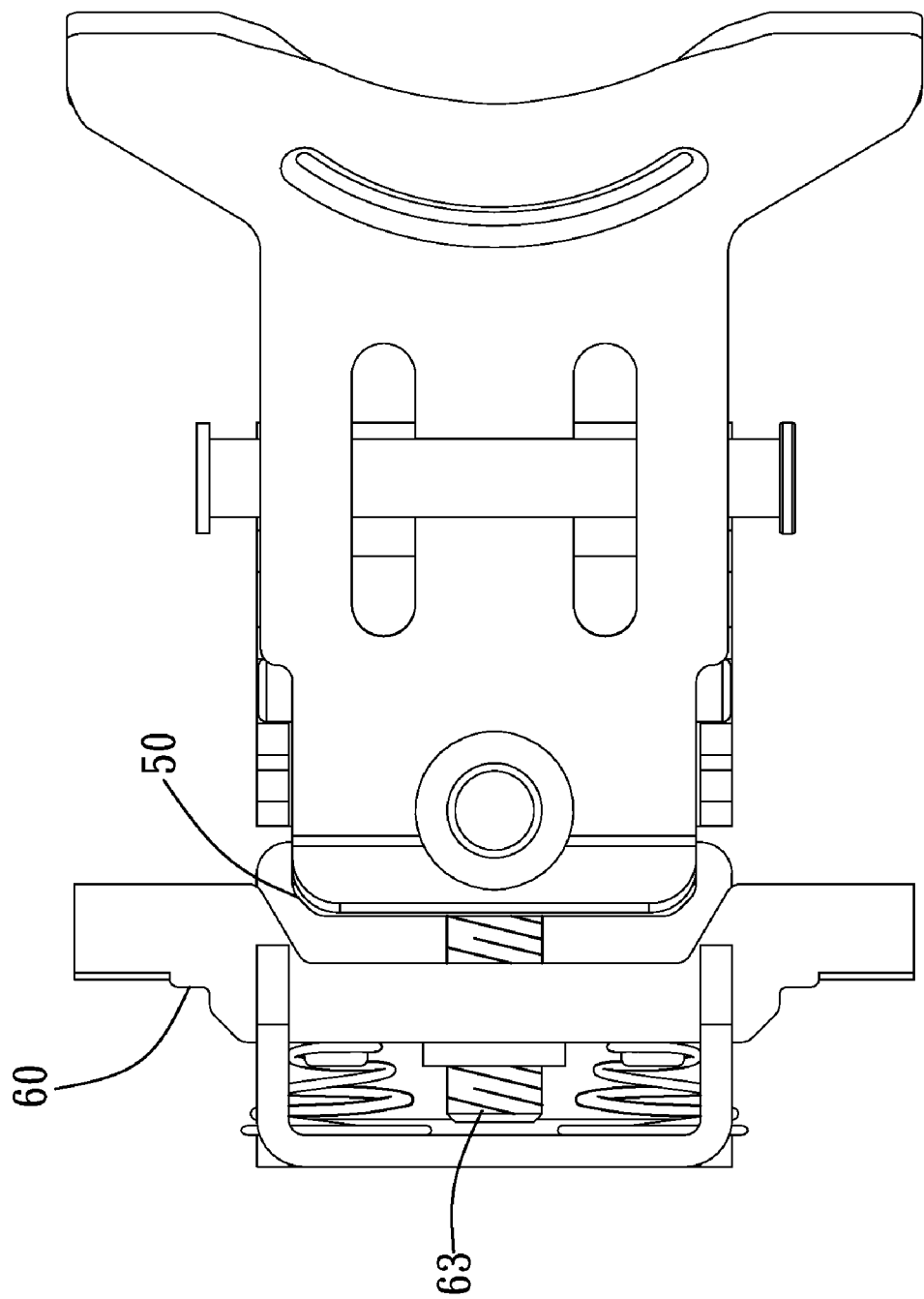
FIG. 9 is a schematic view showing that the anti-slip block in accordance with the present invention is moved relative to the screw.

In addition, as shown in FIGS. 8 and 9, the screw 63 of the anti-slip block 60 extending from the through hole 115 of the stop plate 114 of the bottom frame 11 of the frame body 10 can be rotated to adjust a screwing depth of the screw 63 in the anti-slip block 60. Since the screw 63 of the anti-slip block 60 is abutted against the slide block 50, when the screwing depth of the screw 63 is adjusted, as shown in FIG. 9, the anti-slip block 60 will be moved relative to the screw 63, thus adjusting the relative distance between the anti-slip block 60 and the slide block 50.

With such arrangements, when the slide block 50 pushes the screw 63 of the anti-slip block 60 to drive the anti-slip block 60 to move, the moving distance of the anti-slip block 60 will not change, but the final position of the anti-slip block 60 will change, since the position of the screw 63 doesn't change after adjustment of the screw 63, only the relative distance between the anti-slip block 60 and the slide block 50 changing, the tightness between the anti-slip block 60 and the press surfaces 73 of the wheels 70 can be adjusted to change the braking effect of the anti-slip block 60 on the wheels 70.

While we have shown and described various embodiments in accordance with the present invention, it is clear to those skilled in the art that further embodiments may be made without departing from the scope of the present invention.

What is claimed is:

1. A caster with a brake structure comprising:
   a frame body;
   an operating element being inserted through the frame body;
   a pivot plate being pivoted to the frame body, a first end of the pivot plate supporting against the operating element, and a second end of the pivot plate including at least one engaging edge, when the operating element is pressed downwards, the first end of the pivot plate will be pushed to move downwards, so that the pivot plate will pivot to make the second end of the pivot plate move upwards;
   a lifting block being elastically disposed on the frame body and located at a lower side the pivot plate, the first end of the pivot plate pressing against an upper side of the lifting block, upon rotating, the pivot plate will push the lifting block to move downwards;
   a slide block being slidably disposed on the frame body, between the lifting block and the slide block being disposed a push means for pushing the slide block to move horizontally while the lifting block descends;
   an anti-slip block being elastically disposed on the frame body and located in a moving direction of the slide block, while moving, the slide block will push the anti-slip block to move; and
   at least one wheel being rotatably disposed on the frame body and provided in an inner side thereof with at least one positioning recess opposite the engaging edge of the pivot plate, and a press surface opposite the anti-slip block, so that when pivot plate pivots, the engaging edge of the pivot plate will be allowed to be inserted into the positioning recess to stop the wheel, when moving, the anti-slip block will press against the press surface of the wheel to stop the wheel;
   wherein the frame body includes a bottom frame, the bottom frame includes two rails, the slide block includes two protrusions on a bottom thereof, the two protrusions are disposed in the two rails of the bottom frame in such a manner that the slide block is slidably disposed on the frame body.

2. The caster with a brake structure as claimed in claim 1, wherein the frame body includes two side frames, the bottom frame includes two vertically-extended connecting plates at two opposite sides thereof, the side frames are disposed on the respective connecting plates of the bottom frame, between the two side frames is connected a top plate, the top plate is located above the bottom frame and includes a through hole, the operating element is cylindrical and includes a middle shoulder portion in such a manner that one end of the operating element is inserted through the through hole of the top plate of the frame body, and the shoulder portion supports against the top plate.

3. The caster with a brake structure as claimed in claim 1, wherein the frame body includes two side frames, the bottom frame includes two vertically-extended connecting plates at two opposite sides thereof, the side frames are disposed on the respective connecting plates of the bottom frame, each of the side frames includes a pivot hole, the pivot plate includes a middle pivot portion, a pivot pin is inserted through the pivot portion of the pivot plate and the pivot holes of the two side frames to allow the pivot plate to pivot relative to the frame body.

4. The caster with a brake structure as claimed in claim 1, wherein the bottom frame includes two vertically-extended connecting plates at two opposite sides thereof, each of the connecting plates includes a vertical notch, the lifting block is provided with a guide pin, both ends of the guide pin protrude from two opposite sides of the lifting block and are located in the notches of the connecting plates, between the lifting block and the bottom frame is disposed a spring in such a manner that the lifting block is elastically disposed on the frame body.

5. The caster with a brake structure as claimed in claim 1, wherein the frame body includes a bottom frame and two side frames, the bottom frame includes two vertically-extended connecting plates at two opposite sides thereof, the bottom frame further includes a vertically-extended stop plate at another side thereof, the stop plate includes a through hole, the side frames are disposed on the respective connecting plates of the bottom frame, each of the side frames includes an opening, the anti-slip block includes a threaded hole and at least one anti-slip portion, a screw is screwed in the threaded hole of the anti-slip block and inserted through the through hole of the stop plate, between the anti-slip block and the stop plate are disposed two springs in such a manner that the anti-slip block is elastically disposed on the frame body, the screw of the anti-slip block is abutted against the slide block so as to be pushed by the slide block, the anti-slip portion of the anti-slip block protrudes outwards from the opening of one of the side frames and is located opposite the press surface of the wheel.

6. The caster with a brake structure as claimed in claim 1, wherein the frame body includes two side frames, the bottom frame includes two rails, the bottom frame includes two vertically-extended connecting plates at two opposite sides thereof, the side frames are disposed on the respective connecting plates, and each of the side frames includes a shaft-holding hole for insertion of a shaft on the wheel, the wheel is provided in the inner side thereof with plural annularly arranged positioning recesses, the press surface is annular.

7. The caster with a brake structure as claimed in claim 1, wherein two wheels are provided, the pivot plate includes two engaging edges, the two wheels are coaxially disposed on the frame body, the respective engaging edges are to be inserted into the positioning recesses of the respective wheels, the anti-slip block is located opposite press surfaces of the two wheels.

* * * * *